United States Patent
Dardona et al.

(10) Patent No.: US 11,274,950 B2
(45) Date of Patent: Mar. 15, 2022

(54) FABRICATION OF HIGH DENSITY SENSOR ARRAY

(71) Applicant: United Technologies Corporation, Farmington, CT (US)

(72) Inventors: Sameh Dardona, South Windsor, CT (US); Callum Bailey, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 286 days.

(21) Appl. No.: 16/443,056

(22) Filed: Jun. 17, 2019

(65) Prior Publication Data

US 2020/0393274 A1    Dec. 17, 2020

(51) Int. Cl.
*G01D 21/02* (2006.01)
*G01B 7/16* (2006.01)
(Continued)

(52) U.S. Cl.
CPC ............... *G01D 21/02* (2013.01); *G01B 7/16* (2013.01); *G01K 7/16* (2013.01); *G01L 1/16* (2013.01); *G01P 15/0802* (2013.01)

(58) Field of Classification Search
CPC ....... G06F 3/0445; G06F 3/044; G01D 21/02; G01B 7/16; G01K 7/16; G01L 1/16; G01P 15/0802
(Continued)

(56) References Cited

U.S. PATENT DOCUMENTS 3,762,953 A    10/1973   Barnowski et al.
10,012,552 B2   7/2018   Batzinger et al.
(Continued)

FOREIGN PATENT DOCUMENTS

EP    3184180 A1    6/2017
EP    3431712 A1    1/2019
WO    2016100218 A1    6/2016

OTHER PUBLICATIONS

Extended European Search Report dated Oct. 15, 2020, received for corresponding European Application No. 20178476.6, six pages.
(Continued)

*Primary Examiner* — Octavia Hollington
(74) *Attorney, Agent, or Firm* — Kinney & Lange, P.A.

(57) ABSTRACT

A sensor array having a lattice topology includes interconnects having an electrically-conductive layer sandwiched between two dielectric layers, the interconnects defining first-axis interconnects, second-axis interconnects, and interconnect junctions, sensor nodes located on associated interconnect junctions thereby defining an associated first-axis line and second-axis line, a sensor on an associated sensor node, a primary first-axis interconnect interface that is electrically connected to the first-axis interconnects, and a primary second-axis interconnect interface that is electrically connected to the second-axis interconnects. Each sensor node includes a first electrode that is electrically connected to an associated first-axis line, a second electrode that is electrically connected to an associated second-axis line, and a bypass bridge that electrically isolates the associated second-axis line from the associated first-axis line.

19 Claims, 7 Drawing Sheets

(51) Int. Cl.
*G01K 7/16* (2006.01)
*G01L 1/16* (2006.01)
*G01P 15/08* (2006.01)

(58) Field of Classification Search
USPC ..................................................... 73/514.34
See application file for complete search history.

(56) References Cited

U.S. PATENT DOCUMENTS

| | | | | |
|---|---|---|---|---|
| 10,867,914 | B2* | 12/2020 | Dardona | H05K 1/0283 |
| 10,903,415 | B2* | 1/2021 | Dardona | H01L 27/20 |
| 2001/0030324 | A1* | 10/2001 | Morikawa | H01L 27/14692 |
| | | | | 257/59 |
| 2005/0019589 | A1 | 1/2005 | Wiedemann et al. | |
| 2006/0254366 | A1* | 11/2006 | Williamson | G01L 1/22 |
| | | | | 73/786 |
| 2011/0118990 | A1 | 5/2011 | Sidhu et al. | |
| 2012/0190989 | A1* | 7/2012 | Kaiser | A61B 5/0031 |
| | | | | 600/476 |
| 2016/0290880 | A1 | 10/2016 | Lewis et al. | |
| 2017/0106585 | A1 | 4/2017 | Nino et al. | |
| 2017/0213648 | A1 | 7/2017 | Joyce et al. | |
| 2017/0228070 | A1* | 8/2017 | Roberts | G06F 3/0443 |
| 2017/0305301 | A1 | 10/2017 | McMillen et al. | |
| 2017/0325724 | A1 | 11/2017 | Wang et al. | |
| 2018/0175158 | A1 | 6/2018 | Rogers et al. | |

OTHER PUBLICATIONS

Jason Trelewicz, Ph.D., MesoPlasma Direct Write Fabrication of Conformal, Harsh Environment Sensors, Passive Wireless Sensor Tag Workshop, Jul. 27-28, 2011, Houston, TX, 20 pages.

* cited by examiner

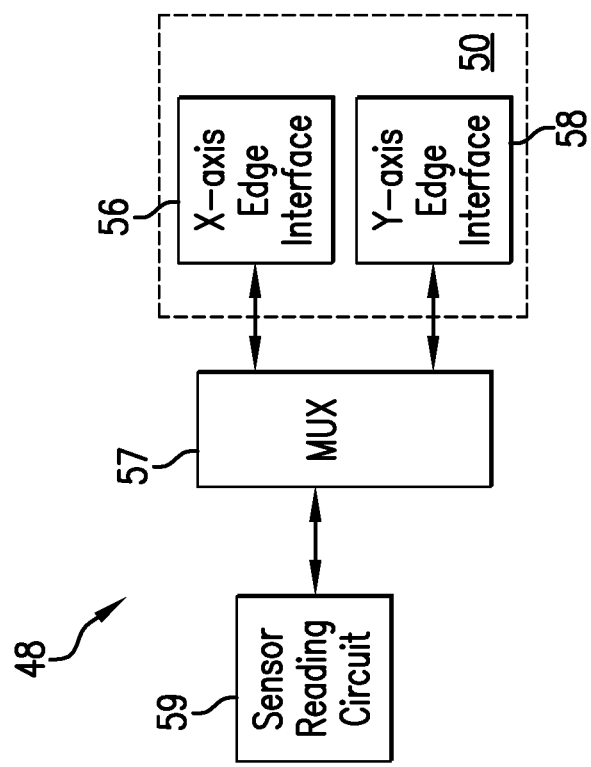
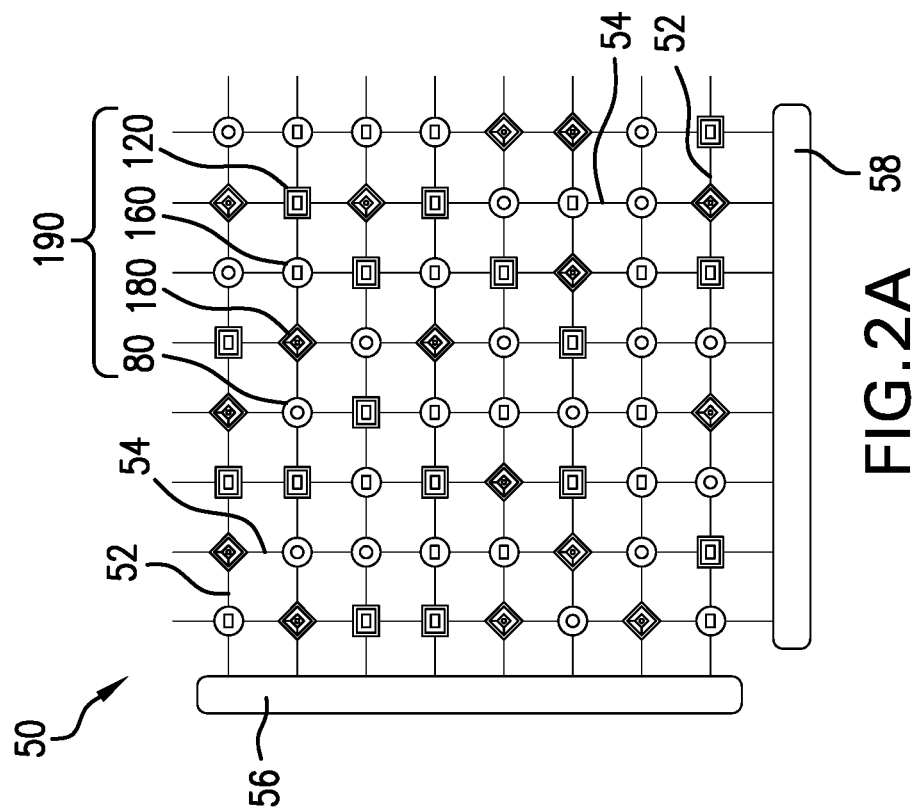
FIG. 2B
FIG. 2A

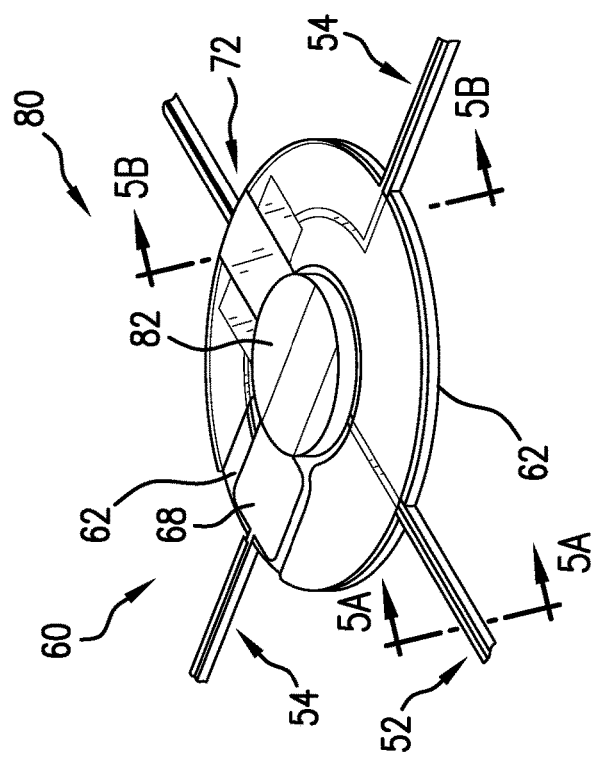
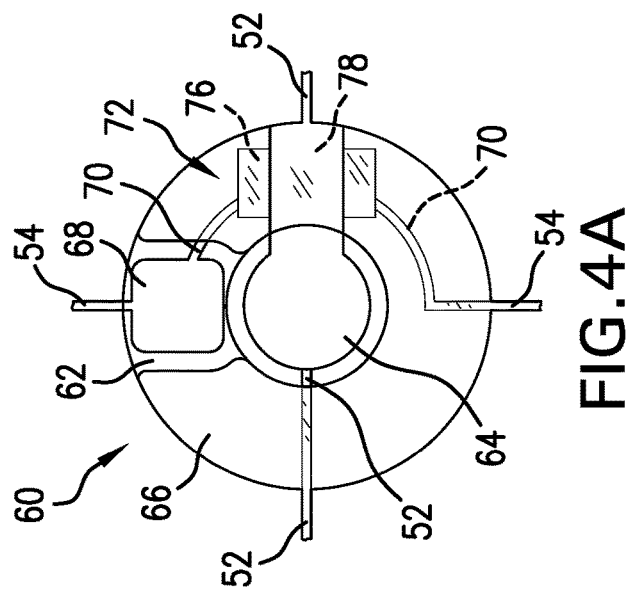
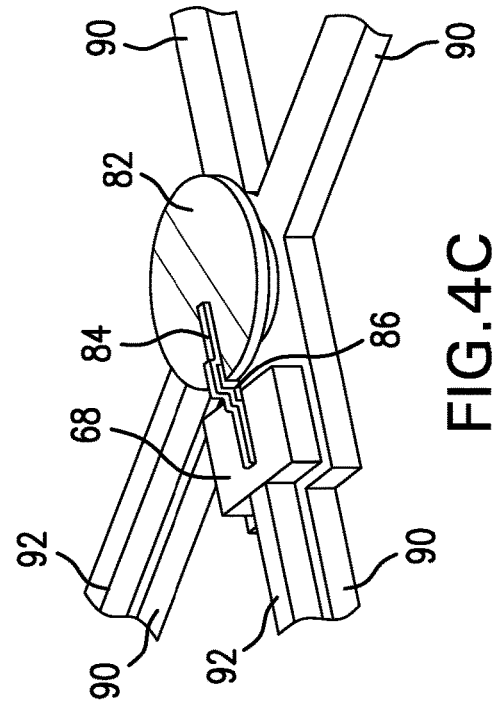
FIG.4B
FIG.4C
FIG.4A

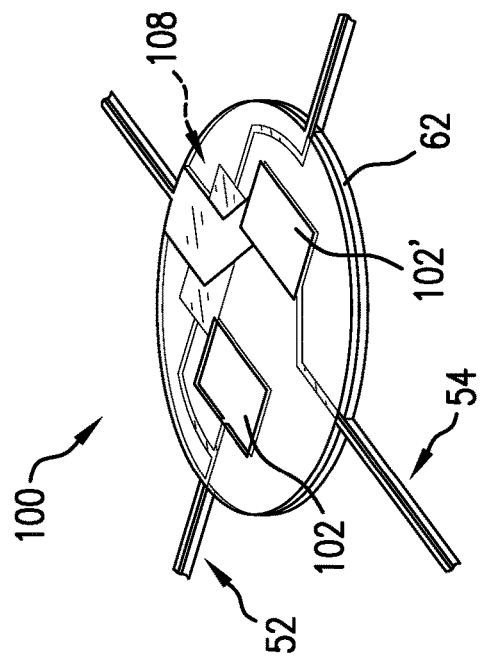
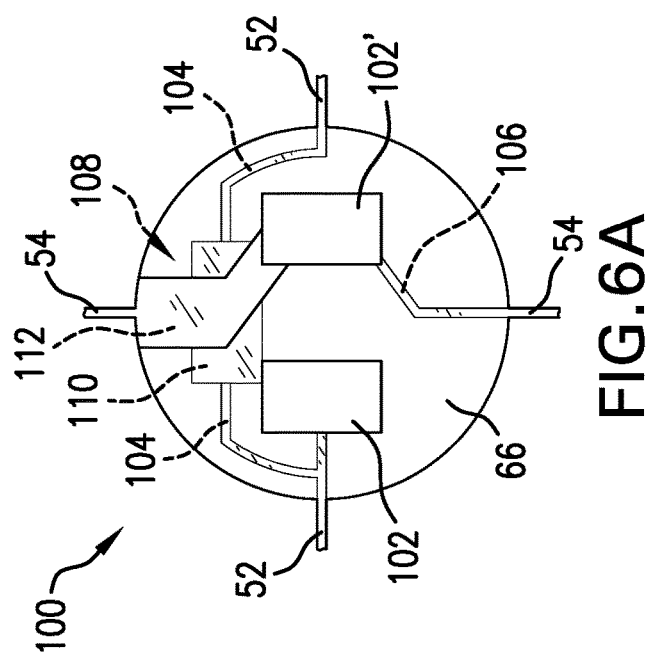

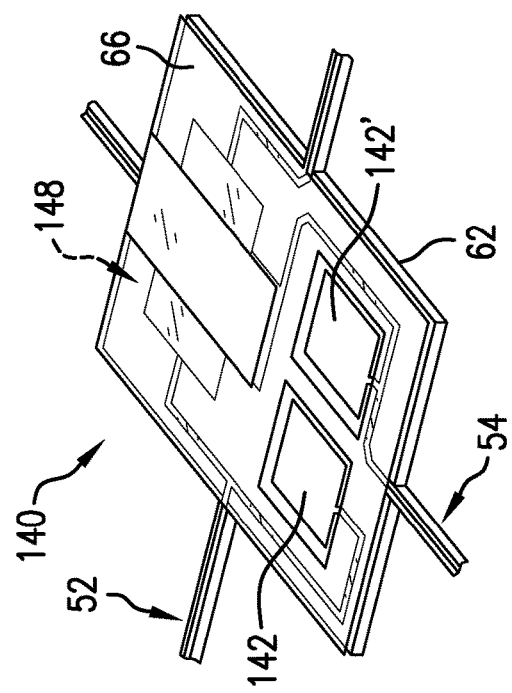
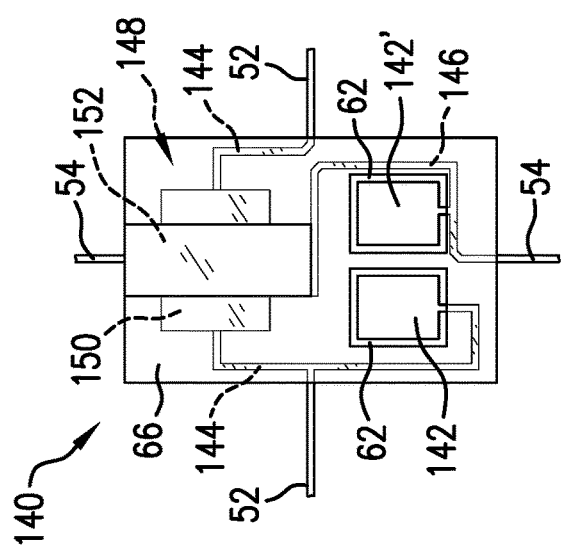
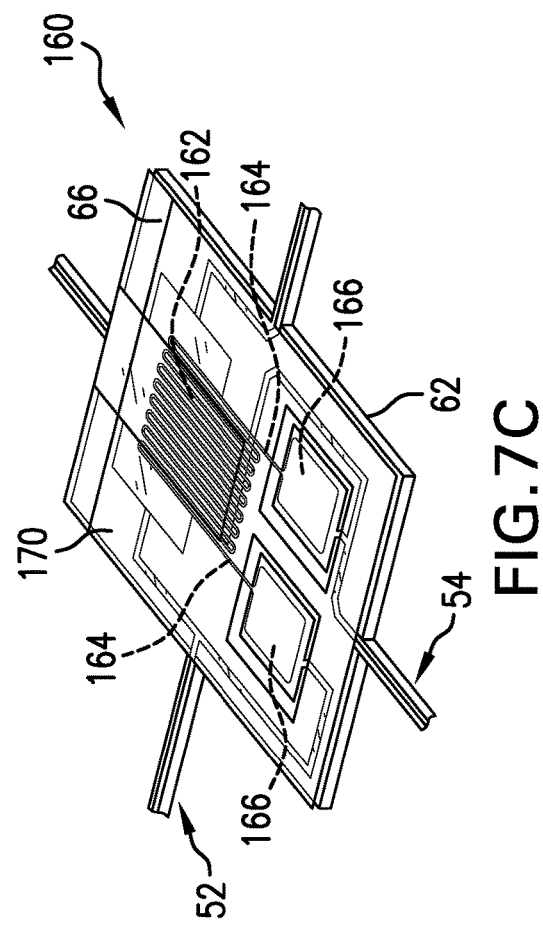
FIG. 7B
FIG. 7C
FIG. 7A

FABRICATION OF HIGH DENSITY SENSOR ARRAY

STATEMENT OF GOVERNMENT INTEREST

This invention was made with Government support under Contract No.: FA8650-15-2-5401, awarded by the Department of the Air Force. The Government has certain rights in the invention.

CROSS-REFERENCE TO RELATED APPLICATION(S)

This application is related to U.S. patent application Ser. No. 16/266,837, entitled "LARGE STRUCTURE MONITORING WITH A SUBSTRATE-FREE FLEXIBLE SENSOR SYSTEM", filed Feb. 4, 2019.

BACKGROUND

Asset monitoring is a critical safety and cost saving factor for a wide variety of aerospace, commercial, and infrastructure assets, with examples including aircraft components, road bridges, and automotive vehicles. The monitoring of parameters on an asset can be helpful in monitoring the lifecycle of that asset, including the detection of asset failure, or the detection of parameters that can lead to failure. Typically, a sensor that monitors a particular parameter at a particular point on an asset is mounted on or embedded in the surface of the asset. Additionally, electrical interconnects and associated circuitry are also generally required for asset monitoring. Individual sensors that are mounted on or near the surface of an asset can be helpful in the monitoring of that asset. However, it can be preferable to have a greater number of sensors across an asset's surface to allow for a greater density of monitored parameters. In some applications, a substrate containing sensors and interconnect circuitry can be applied to the monitored surface of an asset. Generally, the accompanying increase in size and/or weight of the asset monitoring system can have an adverse effect on the structural properties of the monitored surface, and/or the performance of the asset.

As the surface area density of monitoring points on an asset increases, the associated size and/or weight of the electrical interconnects and the associated circuitry for those sensors also increases. Moreover, as the monitored surface area of an asset increases, so too can the difficulty in fabricating the large network of sensors and associated routing interconnects. Manufacturing limitations can affect the ability to fabricate a sensor network for assets having a larger monitored surface area. Typically, as the number of sensors on a sensor network increases, so too does the complexity of routing interconnects that help provide external electrical connections to each of the sensors on the network. This can reduce the number of sensors that can be deployed on a particular sensor network. A need exists for a flexible sensor array that reduces or eliminates the need for routing interconnects dispersed throughout the lattice network of the sensor array.

SUMMARY

A sensor array having a lattice topology includes interconnects having an electrically-conductive layer sandwiched between two dielectric layers, the interconnects defining first-axis interconnects, second-axis interconnects, and interconnect junctions, sensor nodes located on associated interconnect junctions thereby defining an associated first-axis line and second-axis line, a sensor on an associated sensor node, a primary first-axis interconnect interface that is electrically connected to the first-axis interconnects, and a primary second-axis interconnect interface that is electrically connected to the second-axis interconnects. Each sensor node includes a first electrode that is electrically connected to an associated first-axis line, a second electrode that is electrically connected to an associated second-axis line, and a bypass bridge that electrically isolates the associated second-axis line from the associated first-axis line.

A method of interrogating a sensor in a sensor array having a lattice topology and including a plurality of interconnects having an electrically-conductive layer sandwiched between two dielectric layers defining first-axis interconnects, second-axis interconnects, and interconnect junctions, sensor nodes located on associated interconnect junctions thereby defining an associated first-axis line and second-axis line, a sensor on an associated sensor node, a primary first-axis interconnect interface that is electrically connected to the first-axis interconnects, and a primary second-axis interconnect interface that is electrically connected to the second-axis interconnects. Each sensor node includes a first electrode that is electrically connected to an associated first-axis line, a second electrode that is electrically connected to an associated second-axis line, and a bypass bridge that electrically isolates the associated second-axis line from the associated first-axis line. The method includes performing the steps of enabling one of the first-axis interconnects with the primary first-axis interconnect interface, enabling one of the second-axis interconnects with the primary second-axis interconnect interface, and interrogating the sensor corresponding to the enabled first-axis interconnect and the enabled second-axis interconnect with a sensor reading circuit.

BRIEF DESCRIPTION OF THE DRAWINGS

FIG. 2A is a schematic view of a sensor array.

FIG. 2B is a schematic block diagram of an interface for reading the sensor array shown in FIG. 2A.

FIG. 4A is a top view of a interconnect-sharing sensor node.

FIG. 4B is a perspective view of the interconnect-sharing sensor node shown in FIG. 4A with a piezoelectric sensor.

FIG. 4C is a perspective view of the interconnect-sharing sensor node shown in FIG. 4B showing the connection with the piezoelectric sensor.

FIG. 6A is a top view of a second embodiment of the interconnect-sharing sensor node.

FIG. 6B is a perspective view of the interconnect-sharing sensor node shown in FIG. 6A.

FIG. 6C is a perspective view of the interconnect-sharing sensor node shown in FIG. 6A with a resistance temperature detector sensor.

FIG. 7A is a top view of a third embodiment of the interconnect-sharing sensor node.

FIG. 7B is a perspective view of the interconnect-sharing sensor node shown in FIG. 7A.

FIG. 7C is a perspective view of the interconnect-sharing sensor node shown in FIG. 7A with a piezoresistive strain sensor.

DETAILED DESCRIPTION

Figure 1:
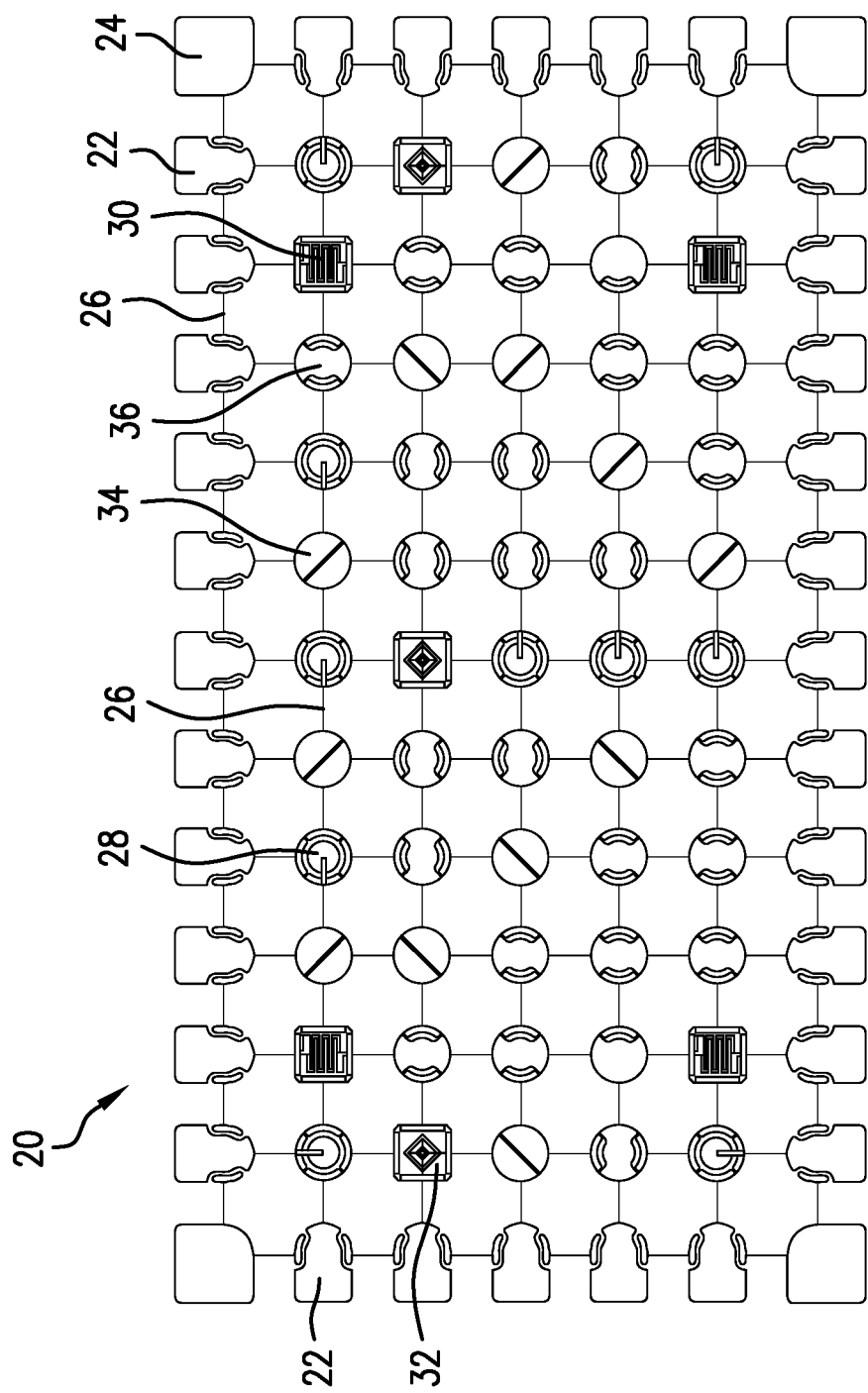
FIG. 1 is a top view of sensor system with routing interconnects of the prior art.

FIG. 1 is a top view of a sensor system with routing interconnects of the prior art. Shown in FIG. 1 are sensor system 20, edge contact pads 22, corner contact pads 24, interconnects 26, piezoelectric sensors 28, resistance temperature detectors 30, strain sensors 32, and routing junctions 34, 36. Sensor system 20 includes edge contact pads 22 and corner contact pads 24 around the periphery which provide external electrical connections to a network of overlapping interconnects 26. Interconnects 26 are electrically-conductive strands that form a substrate-free lattice network that can be deployed on the surface of an asset (not labeled). Interconnects 26 are either vertically-oriented or horizontally-oriented, overlapping in a net-like pattern. Each overlap point can be referred to as an interconnect node (not labeled). A minority of the interconnect nodes are occupied by a sensor, either piezoelectric sensor 28, resistance temperature detector (RTD) 30, or strain sensor 32. A majority of the interconnect nodes are occupied by a routing junction to form the network of electrical connections between piezoelectric sensors 28, RTDs 30, strain sensors 32, edge contact pads 22, and corner contact pads 24, with exemplary routing junctions 34, 36 being labeled. The ratio between the number of sensors (i.e., piezoelectric sensors 28, RTDs 30, strain sensors 32) and the number of routing junctions (i.e., routing junctions 34, 36) can vary depending on various factors including the number of interconnect nodes and the specific types of sensors. In an exemplary embodiment, a particular sensor can be used in about 30% of the interconnect nodes, with the remaining 70% of interconnect nodes being used for routing junctions 34, 36.

Figure 2C:
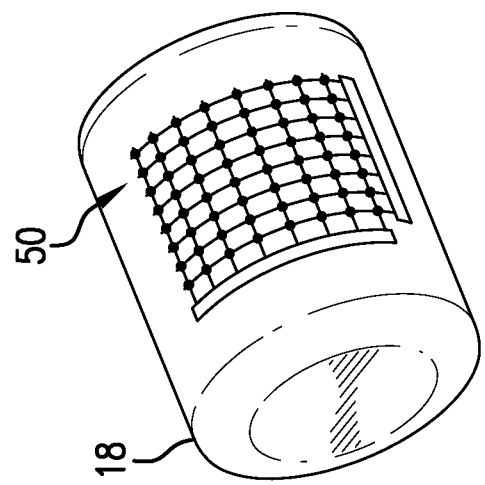
FIG. 2C is a perspective view of the sensor array shown in FIG. 2A deployed on an asset.

FIG. 2A is a schematic view of a sensor array. FIG. 2B is a schematic block diagram of an interface for reading the sensor array shown in FIG. 2A. FIG. 2C is a perspective view of the sensor array shown in FIG. 2A deployed on an asset. Shown in FIGS. 2A-2C are monitored asset 18, sensor array interface 48, sensor array 50, x-axis interconnects 52, y-axis interconnects 54, x-axis interconnect interface 56, multiplexer 57, y-axis interconnect interface 58, sensor reading circuit 59, piezoelectric sensor nodes 80, resistance temperature detector (RTD) nodes 120, strain sensor nodes 160, 180, and interconnect-sharing sensor nodes 190. Piezoelectric sensor nodes 80, RTD nodes 120, and strain sensor nodes 160, 180 can be generally referred to as interconnect-sharing sensor nodes 190, as will be described. In the illustrated embodiment, sensor array 50 includes a network of overlapping x-axis interconnects 52 and y-axis interconnects 54 in a substantially rectangular array which can be described as a net-like structure. As depicted in FIG. 2A, x-axis interconnects 52 are substantially parallel to each other. Similarly, y-axis interconnects 54 interconnects are substantially parallel to each other. It is to be appreciated that references to x- and y-axes are arbitrary, for descriptive purposes. Moreover, as used in the present disclosure, terms such as "vertical" and "horizontal" are arbitrary, as used in describing the various embodiments that are illustrated in the figures. All orientations are within the scope of the present disclosure without regard to spatial orientation.

Referring to FIG. 2A, x-axis interconnects 52 can be called first-axis interconnects, and y-axis interconnects 54 can be called second-axis interconnects. Sensor array 50 can be described as having a lattice or net-like topology, with x-axis interconnects 52 overlapping y-axis interconnects 52 thereby forming a number of interconnect junctions. In the illustrated embodiment, x-axis interconnects 52 and y-axis interconnects 54 meet at substantially right angles. As will be described later in FIG. 5A, x-axis interconnects 52 and y-axis interconnects 54 can include an electrically-conductive trace that is sandwiched between dielectric material (not shown in FIG. 2). Accordingly, sensor array 50 is flexible and can conform to a curved surface of monitored asset 18, as shown in FIG. 2C. In the illustrated embodiment, monitored asset 18 is an aircraft nacelle. In other embodiments, monitored asset 18 can be any component whereby monitoring by sensor array 50 is desired, with non-limiting examples including aircraft components, vehicles, ships, buildings, and bridges. Referring again to FIG. 2A, each of the x-axis interconnects 52 is electrically connected to x-axis interconnect interface 56. Similarly, each of the y-axis interconnects 54 is electrically connected to y-axis interconnect interface 58. In the illustrated embodiment, there are eight x-axis interconnects 52 and eight y-axis interconnects 54, collectively forming sixty-four (64) interconnect intersection points (not labeled), with each interconnect intersection point being the location of a particular interconnect-sharing sensor node 190. It is to be appreciated that the locations and the distribution of piezoelectric sensor nodes 80, RTD nodes 120, strain sensor nodes 160, 180 is exemplary, and can be different in various embodiments. Each individual interconnect-sharing sensor node 190 is electrically connected between a respective x-axis interconnect 52 and y-axis interconnect 54, as will be described in greater detail later in FIGS. 4A-4C, 6A-6C, and 7A-7C. Each interconnect-sharing sensor node 190 is powered and interrogated with an interconnect-sharing architecture, as will be described. Line sharing means the sensor nodes share a common axis connected to the same transmission line (i.e., x-axis interconnects 52, y-axis interconnects 54), with the multiplexing of the power and ground connections to select (i.e., enable, interrogate) a particular interconnect-sharing sensor node 190 from which data are to be collected. The interconnect-sharing architecture of the present disclosure eliminates the need for routing junctions (e.g., routing junctions 34, 36 as shown in FIG. 1) throughout sensor array 50. Sensor array 50 can also be referred to as a high-density sensor array or as a fully-populated sensor array, because, as shown in the illustrated embodiment, a interconnect-sharing sensor node 190 is located at every intersection of an x-axis interconnect 52 and a y-axis interconnect 54.

Referring again to FIG. 2A, sensor array 50 can be printed (i.e., additively-manufactured) on a sacrificial substrate (not shown) that is later removed. As used in this disclosure, "printing" is an additive-manufacturing process that can refer to any of a number of processes that can deposit material for fabricating a component or components. The sacrificial substrate can be a plate, sheet, or continuous roll of material, and can be thick or thin, and/or rigid or flexible. In a particular embodiment, the sacrificial substrate can be a thin-film material on a roll, whereby sensor array 50 is fabricated using a roll-to-roll (R2R) manufacturing process. In another particular embodiment, the sacrificial substrate can be a sheet of rigid or semi-rigid material, whereby sensor array 50 is fabricated using a large screen printing manufacturing process. The sacrificial substrate can be chemically soluble or insoluble, being chemically removed from sensor array 50. The lattice topology that defines sensor array 50 can be delivered by one of several possible additive manufacturing and/or printing methods, with non-limiting examples including screen printing, R2R, gravure printing, ink jet printing aerosol jet (AJ) deposition, material extrusion, extrusion direct-write microdispensing, ink jet printing, and thermal-spray deposition. Accordingly, sensor array 50 can be referred to as a substrate-free sensor array. The electrical interconnects to interconnect-sharing sensor nodes 190 will be described in greater detail later in FIGS. 4A-4C, 6A-6C, and 7A-7C. The structure of x-axis interconnects 52 and y-axis interconnects 54 will be described in greater detail later in FIG. 5A.

Referring to FIGS. 2A-2B, during operation of sensor array 50, a particular interconnect-sharing sensor node 190 is individually interrogated by multiplexer 57 by electrically connecting x-axis interconnect interface 56 to the associated x-axis interconnect 52, and electrically connecting y-axis interconnect interface 58 to the associated y-axis interconnect 54, thereby electrically coupling the respective interconnect-sharing sensor node 190 to sensor reading circuit 59.

Referring to FIG. 2B, during interrogation by the sensor reading circuit 59, the interrogated (i.e., enabled) interconnect-sharing sensor node 190 electrically communicates a particular electrical signal to sensor reading circuit 59 via multiplexer 57, x-axis interconnect interface 56, and y-axis interconnect interface 58. Multiplexer 57 can be referred to as a MUX or as a multiplexer circuit. The following discussion is provided as non-limiting examples of the various electrical signals that can be provided by any of the individual interconnect-sharing sensor nodes 190. Piezoelectric sensor node 80 can provide a voltage signal that is representative of an impact (i.e., mechanical impact). RTD node 120 can provide a resistance (i.e., electrical resistance) value that is indicative of a temperature. Strain sensor nodes 160, 180 can provide a resistance signal that is representative of level of strain (mechanical strain). In the illustrated embodiment, strain sensor nodes 180 are similar to strain sensor nodes 160, while being offset at a 45 degree rotational angle. In some embodiments, other types of sensors can be used to detect pressure, vibration, light (i.e., photons), sound (i.e., acoustic waves), magnetism (e.g., Hall Effect, magnetoresistive (MR) sensor), and radio frequency (RF) waves, for example. In a particular embodiment, a micro-electrical mechanical system (MEMS) pressure sensor and/or MEMS accelerometer can be used. In these or other embodiments, various interconnect-sharing sensor nodes 190 can provide electrical signals that can be measured as a voltage, a waveform, a resistance, a capacitance, and/or an inductance. In other embodiments, one or more interconnect-sharing sensor nodes 190 can include energy storage devices and/or integrated circuits (ICs). In these or other embodiments, an interconnect-sharing sensor node 190 can be a transducer that detects and/or emits a particular signal. For example, a particular interconnect-sharing sensor node 190 can emit light, sound, and/or RF signals. Interconnect-sharing sensor nodes 190 that include light-emitting diodes (LEDs), piezo-acoustic transducers, and RF antennas are exemplary embodiments. Accordingly, in some embodiments, a interconnect-sharing sensor node 190 can be referred to as an emitter. In an exemplary embodiment, an interconnect-sharing sensor node 190 can be a radio-frequency identification (RFID) chip.

Referring again to FIGS. 2A-2B, a particular interconnect-sharing sensor node 190 is interrogated for a period of time that is sufficient to read the associated sensor, with the sensor reading time being dependent on the particular type of sensor. In an exemplary embodiment, each of the sixty-four (64) interconnect-sharing sensor nodes 190 on sensor array 50 can be interrogated in any sequence at any time, by temporarily making electrical connections via multiplexer 57 to x-axis interconnect interface 56 and y-axis interconnect interface 58. The topology of sensor array 50 can also allow multiple interconnect-sharing sensor node 190 to be interrogated concurrently so long as no two interconnect-sharing sensor nodes 190 that share the same x-axis interconnect 52 and/or y-axis interconnect 52 are interrogated at the same time. Accordingly, in the illustrated embodiment, as many as eight interconnect-sharing sensor nodes 190 can be interrogated concurrently.

Figure 3:
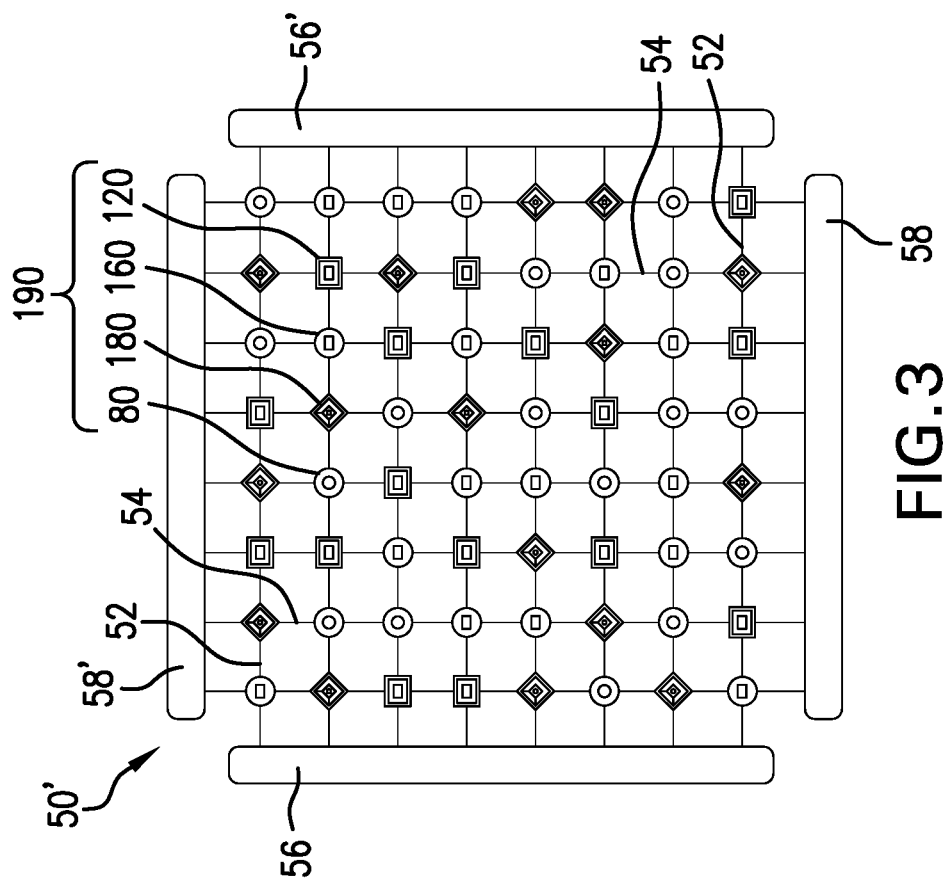
FIG. 3 is a schematic view of a second embodiment of the sensor array.

FIG. 3 is a schematic view of a second embodiment of the substrate-free high-density sensor array. Shown in FIG. 3 are sensor array 50', x-axis interconnects 52, y-axis interconnects 54, x-axis interconnect interfaces 56, 56', y-axis interconnect interfaces 58, 58', piezoelectric sensor nodes 80, resistance temperature detector (RTD) nodes 120, strain sensor nodes 160, Wheatstone bridge sensor nodes 180, and interconnect-sharing sensor nodes 190, the description of each being substantially similar to that provided above in regard to FIG. 2. X-axis interconnect interface 56 can be referred to as a primary x-axis interconnect interface, and x-axis interconnect interface 56' can be referred to as a secondary x-axis interconnect interface. Similarly, y-axis interconnect interface 58 can be referred to as a primary y-axis interconnect interface, and x-axis interconnect interface 58' can be referred to as a secondary y-axis interconnect interface. Each of the x-axis interconnects 52 are electrically connected to x-axis interconnect interfaces 56, 56', which can also be referred to as a left and right x-axis interconnect interface, respectively, or as a first and second x-axis interconnect interface. Similarly, each of the y-axis interconnects 54 are electrically connected to y-axis interconnect interfaces 58, 58', which can be referred to as a bottom and top y-axis interconnect interface, respectively, or as a first and second y-axis interconnect interface. X-axis interconnect interfaces 56, 56' and/or y-axis interconnect interfaces 58, 58' can also be referred to as sensor array edge interfaces. It is to be appreciated that the illustrated embodiment is exemplary, and that in another embodiment, x-axis interconnects 52 can be associated with a multiplexing interface and y-axis interconnects 54 can be associated with a multiplexing interface. Accordingly, x-axis interconnect interfaces 56, 56' can be referred to as primary and secondary x-axis multiplexing interfaces, respectively, and y-axis interconnect interfaces 58, 58' can be referred to as primary and secondary y-axis multiplexing interfaces. The designation of primary and secondary, as used in this regard, is merely to differentiate one from another without signifying one as being preferable over the other.

Referring again to FIG. 3, x-axis interconnect interface 56' (i.e., right x-axis interconnect interface) and y-axis interconnect interface 58' (i.e., top y-axis interconnect interface) are controlled by multiplexer 57 independently from x-axis interconnect interface 56 (i.e., left x-axis interconnect interface) and y-axis interconnect interface 58 (i.e., bottom y-axis interconnect interface), thereby allowing two interconnect-sharing sensor nodes 190 to be simultaneously interrogated. In the illustrated embodiment, sensor array 50' can be configured to interrogate various interconnect-sharing sensor nodes 190 at about twice the rate as with sensor array 50 shown in FIG. 2.

Referring again to FIG. 3, x-axis interconnect interfaces 56, 56' are redundant to each other, and y-axis interconnect interfaces 58, 58' are also redundant to each other. Accordingly, in some embodiments, sensor array 50' and/or sensor reading circuit 59 can be configured to identify and localize a fault (i.e., breakage) in a particular x-axis interconnect 52 and/or y-axis interconnect 54, thereby allowing any particular interconnect-sharing sensor node 190 to be interrogated by an associated x-axis interconnect interface 56, 56' and y-axis interconnect interface 58, 58' depending on the particular location of the fault. This can be accomplished by embedding multiplexing capabilities within sensor array 50', or externally using x-axis and y-axis edge interfaces 56, 58 and multiplexer 57.

FIG. 4A is a top view of an interconnect-sharing sensor node. FIG. 4B is a perspective view of the interconnect-sharing sensor node shown in FIG. 4A with a piezoelectric sensor. FIG. 4C is a perspective view of the interconnect-sharing sensor node shown in FIG. 4B showing the connection with the piezoelectric sensor. Shown in FIGS. 4A-4C are x-axis interconnect 52, y-axis interconnect 54, piezoelectric sensor junction 60, substrate 62, bottom electrode 64, dielectric top layer 66, top electrode 68, interconnect bypass 70, bypass bridge 72, dielectric crossover 76, conductive crossover 78, piezoelectric sensor node 80, piezoelectric sensor 82, conductive link 84, dielectric ink 86, bottom mechanical support ink 90, conductive ink 92, and top mechanical support ink 94.

Piezoelectric sensor junction 60 is located at the intersection of a particular x-axis interconnect 52 and y-axis interconnect 54, as described above in regard to FIG. 2. Substrate 62 forms the base (i.e., support structure) for piezoelectric sensor junction 60. In the illustrated embodiment, substrate 62 is a dielectric material that can be polyimide (e.g., KAPTON®), polyethylene terephthalate, or polycarbonate, thermoplastic, or cured resin materials. Bottom electrode 64 is deposited on substrate 62, being electrically connected to x-axis interconnect 52, with conductive crossover 78 completing the electrical conduction path of x-axis interconnect 52 through piezoelectric sensor junction 60. Top electrode 68 is deposited on substrate 62, being electrically connected to y-axis interconnect 54, with interconnect bypass 70 completing the electrical conduction path of y-axis interconnect 54 through piezoelectric sensor junction 60. Dielectric top layer 66 provides an overcoat on piezoelectric sensor junction 60. Bypass bridge 72 is formed by dielectric crossover 76 electrically isolating interconnect bypass 70 from conductive crossover 78, and will be described in greater detail later in FIG. 5B. Piezoelectric sensor node 80 is formed by placing piezoelectric sensor 82 on bottom electrode 64, thereby providing an electrical connection between x-axis interconnect 52 and piezoelectric sensor 82, then depositing conductive link 84 to provide an electrical connection between y-axis interconnect 54 (i.e., top electrode 68) and piezoelectric sensor 82. In the illustrated embodiment, piezoelectric sensor 82 is deposited on piezoelectric sensor junction 60 using a pick-and-place (PnP) manufacturing process, thereby forming a flexible hybrid electronic (FHE) network. In the illustrated embodiment, dielectric ink 86 is deposited to provide an electrically-insulating barrier between conductive link 84 and piezoelectric sensor 82. A top mechanical support ink (not shown in FIGS. 4A-4C) can be deposited over piezoelectric sensor node 80. X-axis interconnects 52 and y-axis interconnects 54 include bottom mechanical support ink 90 and conductive ink 92, as shown in FIG. 4C, and will be described in greater detail later in FIG. 5A. When deployed on sensor array 50, 50', one or more piezoelectric sensor nodes 80 can be used to detect an impact (i.e., mechanical impact) on or near the surface of monitored asset 18.

Piezoelectric sensor node 80 is manufactured using one or more of any additive manufacturing process (e.g., as described above in regard to FIG. 2A). In an exemplary embodiment, the various features of piezoelectric sensor node 80 (i.e., including piezoelectric sensor junction 60) can be made using a curable resin. In some embodiments, the curable resin can be a photopolymer (i.e., light-activated resin) that changes properties when exposed to light. A photopolymer that is optimized to respond to ultraviolet (UV) light is known as a UV-curable resin. The process by which printing ink (e.g., photopolymer resin) becomes more viscous or solidifies is also known as curing. A photopolymer cures by the action of photoinitiators that absorb photon energy during exposure to light of a particular wavelength or range of wavelengths. As the printing ink (i.e., photopolymer resin) cures, it becomes sufficiently viscous or solid, while also bonding to any solid material that it is in contact with. In other embodiments, the curable resin can be responsive to an elevated temperature for initiating the curing process. In yet other embodiments, the curable resin can be a thermoplastic, thermoset resin, or thermally-cured ink that uses a thermal solvent for evaporation/sintering of the ink. In yet other embodiments, non-resin materials can be used for one or more of the various features (i.e., layers) of piezoelectric sensor node 80. As used in this disclosure, "curable material" described any material that can undergo viscofication, hardening, and/or solidification during a fabrication process. Accordingly, both resins (i.e., photoresins, thermal-resins) and non-resins can be curable materials. Non-limiting examples of curable non-resins include thermal plastics, inks, metals, and/or other materials that can be deposited (i.e., printed) as powders, molten materials, liquids, and the like by one or more additive-manufacturing processes (e.g., cold spray, thermal spray, thermal solvent evaporation, sintering). It is to be appreciated that the various features (i.e., layers) of piezoelectric sensor node 80 can be made of different curable materials, for example, as described above.

Figure 5B:
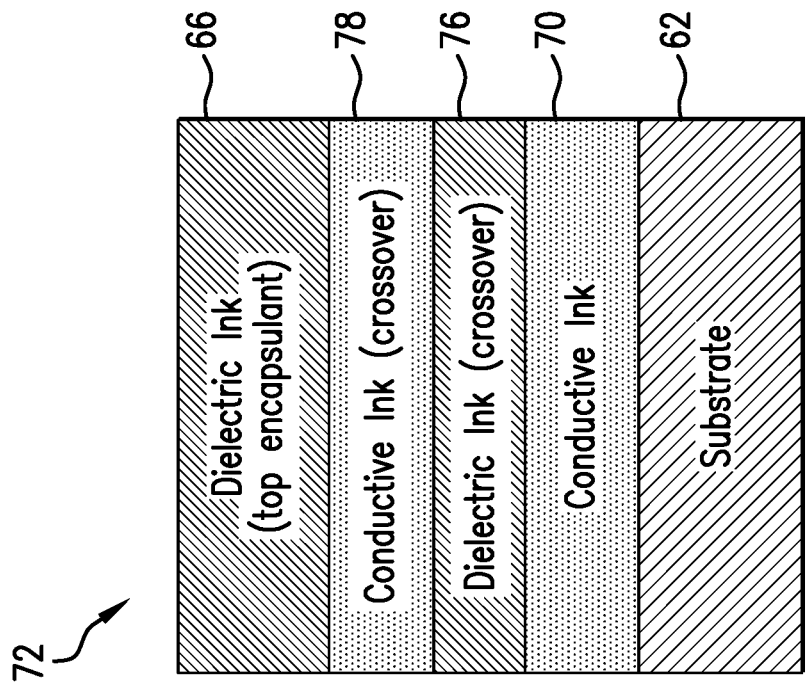
FIG. 5B is a schematic cross-sectional side view of a cross-over pad on the interconnect-sharing sensor node shown in FIG. 4B.
Figure 5A:
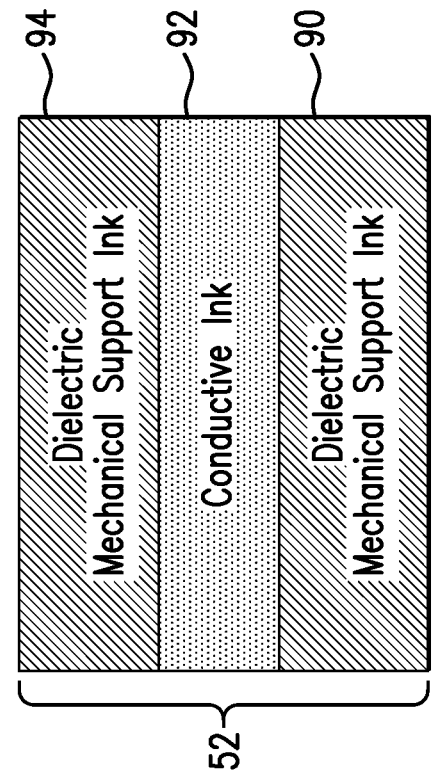
FIG. 5A is a schematic cross-sectional side view of an interconnect line on the interconnect-sharing sensor node shown in FIG. 4B.

FIG. 5A is a schematic cross-sectional side view of x-axis interconnect 52 on piezoelectric sensor node 80 shown in FIG. 4B. Shown in FIG. 5A are x-axis interconnect 52, which includes bottom mechanical support ink 90, conductive ink 92, and top mechanical support ink 94. Discussion will be made with regard to a representative x-axis interconnect 52, while appreciating that y-axis interconnects 54 can have the same or a similar structure. X-axis interconnect 52 can be about 80 microns wide (i.e., 80 μm) and 80 microns thick. In some embodiments, x-axis interconnects 52 can be less than 80 microns wide and/or 80 microns thick. In other embodiments, x-axis interconnects 52 can be more than 80 microns wide and/or 80 microns thick. In a particular embodiment, x-axis interconnects 52 can be more than 200 microns wide and/or 200 microns thick. In some embodiments, the width of a particular x-axis interconnect 52 can be either greater than or less than the thickness. In some of these embodiments, the width of a particular x-axis interconnect 52 can be much greater than the thickness. In designing sensor array 50, several factors can be considered in the selection of the size (i.e., width and thickness) of x-axis interconnects 52 (i.e., and/or y-axis interconnects 54). Non-limiting examples of these factors can include the current-carrying capacity of x-axis interconnects 52, the desired electrical resistance of x-axis interconnect 52, the materials used in x-axis interconnect 52, and the allowable size and/or weight of sensor array 50. In the illustrated embodiment, the conductive ink 92 (i.e., the electrically-conductive portion of x-axis interconnect 52) can be made from conductive inks containing silver, copper, aluminum, gold, platinum, ruthenium, carbon, and/or alloys of these metals. In other embodiments, conductive ink 92 can be made from these and/or other metals, alloys, partial conductors, and/or composites. Bottom mechanical support ink 90 and top mechanical support ink 94 (i.e., dielectric, mechanical support ink) can be made from photoset and/or thermoset polymer dielectric inks, extruded thermoplastics, or the like (e.g., as described above in regard to FIGS. 4A-4C). In the illustrated embodiment, x-axis interconnects 52 are flexible (i.e., bendable, conformable), thereby enabling sensor array 50 to conform to a curved surface when so positioned. It is to be appreciated that the various layers (i.e., bottom mechanical support ink 90, conductive ink 92, and top mechanical support ink 94) can be made of different curable materials, for example, as described above.

FIG. 5B is a schematic cross-sectional side view of bypass bridge 72 on piezoelectric sensor node 80 shown in FIG. 4B. Shown in FIG. 5B are substrate 62, dielectric top layer 66, interconnect bypass 70, dielectric crossover 76, and conductive crossover 78, all being described as above in regard to FIGS. 4A-4C. Interconnect bypass 70 can be referred to as an electrically-conductive layer or trace. Similarly, conductive crossover 78 can be referred to as an electrically-conductive layer or trace. Bypass bridge 72 can also be referred to as a cross-over bridge.

FIG. 6A is a top view of a second embodiment of the interconnect-sharing sensor node configured as a resistance temperature detector (RTD) junction (i.e., for RTD node 120 as shown in FIG. 2A). FIG. 6B is a perspective view of the interconnect-sharing sensor node shown in FIG. 6A. FIG. 6C is a perspective view of the interconnect-sharing sensor node shown in FIG. 6A with a resistance temperature detector (RTD) sensor. Shown in FIGS. 6A-6C are x-axis interconnect 52, y-axis interconnect 54, substrate 62, dielectric top layer 66, RTD junction 100, electrodes 102, 102', interconnect bypass 104, interconnect extension 106, bypass bridge 108, dielectric crossover 110, conductive crossover 112, resistance temperature detector (RTD) node 120, resistance temperature detector (RTD) element 122, and resistance temperature detector (RTD) edge pads 124, 126. The description of x-axis interconnect 52, y-axis interconnect 54, substrate 62, and dielectric top layer 66 are as provided above in regard to FIGS. 4A-4C. RTD junction 100 includes electrodes 102, 102', each providing an electrical connection to respective edge pads 124, 126 of RTD element 122. Electrode 102 is electrically connected to x-axis interconnect 52, and electrode 102' is electrically connected to y-axis interconnect 54. The description of interconnect bypass 104, bypass bridge 108, dielectric crossover 110, and conductive crossover 112 are substantially as provided above in regard to FIGS. 4A-4C, while noting that interconnect bypass 104 completes the electrical conduction path of x-axis interconnect 52 under bypass bridge 108 (i.e., cross-over bridge). Interconnect extension 106 completes the electrical conduction path of y-axis interconnect 54. In the illustrated embodiment, RTD element 122 is deposited on RTD sensor junction 100 using a pick-and-place (PnP) manufacturing process, thereby forming a flexible hybrid electronic (FHE) network. A top mechanical support ink (not shown in FIGS. 6A-6C) can be deposited over RTD node 120. When deployed on sensor array 50, 50', one or more RTD nodes 120 (i.e., including RTD element 122) can be used to detect a temperature value at or near the surface of monitored asset 18.

FIG. 7A is a top view of a third embodiment of the interconnect-sharing sensor node configured as a strain sensor junction (i.e., for strain sensor node 160 as shown in FIG. 2A). FIG. 7B is a perspective view of the interconnect-sharing sensor node shown in FIG. 7A. FIG. 7C is a perspective view of the interconnect-sharing sensor node shown in FIG. 7A with a piezoresistive strain sensor. Shown in FIGS. 7A-7C are x-axis interconnect 52, y-axis interconnect 54, substrate 62, dielectric top layer 66, strain sensor junction 140, electrodes 142, 142', interconnect bypass 144, interconnect extension 146, bypass bridge 148, dielectric crossover 150, conductive crossover 152, strain sensor node 160, strain sensor element 162, strain sensor leads 164, strain sensor electrodes 166, and strain sensor overcoat 170. The description of x-axis interconnect 52, y-axis interconnect 54, substrate 62, dielectric top layer 66, strain sensor junction 140, electrodes 142, 142', interconnect bypass 144, interconnect extension 146, bypass bridge 148, dielectric crossover 150, and conductive crossover 152 are substantially as provided above in regard to FIGS. 4A-4C and 6A-6C. Strain sensor node 160 includes strain sensor element 162, strain sensor leads 164, and strain sensor electrodes 166, electrically connected to x-axis interconnect 52 by electrode 142, and to y-axis interconnect 54 by electrode 142', respectively. Strain sensor overcoat 170 covers strain sensor element 162, thereby sandwiching strain sensor element 162 between conductive crossover 152 and strain sensor overcoat 170. In the illustrated embodiment, strain sensor element 162 is a piezoresistive material having a serpentine pattern, thereby producing a resistance value indicative of a level of strain (i.e., material strain) on the surface of monitored asset 18 where strain sensor node 160 (i.e., sensor array 50, 50') is deployed.

Piezoelectric sensor nodes 80, RTD nodes 120, and strain sensor nodes 160 are exemplary of the various sensors that can be deployed on sensor array 50, 50', and all other types of sensors and/or transducers are within the scope of the present disclosure. Non-limiting examples of other types of sensors and/or transducers were described above in regard to FIG. 2.

Referring back to FIGS. 2-3, sensor array 50, 50' is shown as including eight x-axis interconnects 52 and eight y-axis interconnects 54, collectively forming sixty-four (64) interconnect-sharing sensor nodes 190. In some embodiments, one or more interconnect-sharing sensor nodes 190 can be omitted from sensor array 50, 50', with the particular intersection of x-axis interconnect 52 and y-axis interconnect 54 being a crossing of the respective x-axis interconnect 52 and y-axis interconnect 54 (i.e., physically contacting and electrically insulating). In these embodiments, sensor array 50, 50' can be referred to as a de-populated sensor array while remaining within the scope of the present disclosure (i.e., high-density sensor array). Moreover, sensor array 50, 50' can include either more than or fewer than eight x-axis interconnects 52, and/or either more than or fewer than eight y-axis interconnects 52. All numbers of x-axis interconnects 52 and/or y-axis interconnects 54 are within the scope of the present disclosure.

Discussion of Possible Embodiments

The following are non-exclusive descriptions of possible embodiments of the present invention.

A sensor array having a lattice topology, comprising: a plurality of interconnects comprising an electrically-conductive layer sandwiched between two dielectric layers, the plurality of interconnects defining: a plurality of first-axis interconnects; a plurality of second-axis interconnects; and a plurality of interconnect junctions; a plurality of sensor nodes, each disposed on an associated interconnect junction defining an associated first-axis line and second-axis line; a plurality of sensors, each disposed on an associated sensor node; a primary first-axis interconnect interface, electrically connected to the plurality of first-axis interconnects; and a primary second-axis interconnect interface, electrically connected to the plurality of second-axis interconnects; wherein each of the plurality of sensor nodes comprises: a first electrode, electrically connected to an associated first-axis line; a second electrode, electrically connected to an associated second-axis line; and a bypass bridge, electrically isolating the associated second-axis line from the associated first-axis line.

The sensor array of the preceding paragraph can optionally include, additionally and/or alternatively, any one or more of the following features, configurations and/or additional components:

A further embodiment of the foregoing sensor array, wherein the interconnects are flexible, thereby allowing the sensor array to conform to a curved surface profile.

A further embodiment of the foregoing sensor array, wherein: the electrically-conductive layer comprises at least one of silver, copper, aluminum, gold, platinum, ruthenium, carbon, and/or alloys thereof; and each of the dielectric layers comprises a cured base material.

A further embodiment of the foregoing sensor array, wherein the bypass bridge comprises: an electrically-insulating substrate; a first electrically-conductive trace, disposed on the electrically-insulating substrate; a dielectric layer, disposed on the first conductive layer; and a second electrically-conductive trace, disposed on the dielectric layer, the second electrically-conductive trace being electrically isolated from the first electrically-conductive trace.

A further embodiment of the foregoing sensor array, wherein the primary first-axis interconnect interface and the primary second-axis interconnect interface can enable one of the plurality of first-axis interconnects and one of the plurality second-axis interconnects, respectively, thereby interrogating a sensor node associated with the enabled first-axis interconnect and the enabled second-axis interconnect.

A further embodiment of the foregoing sensor array, further comprising: a secondary first-axis interconnect interface, electrically connected to the plurality of first-axis interconnects; and a secondary second-axis interconnect interface, electrically connected to the plurality of second-axis interconnects.

A further embodiment of the foregoing sensor array, wherein two of the plurality of sensors can be interrogated at the same time by simultaneously: enabling one of the plurality of first-axis interconnects by the primary first-axis interconnect interface; enabling one of the plurality of second-axis interconnects by the primary second-axis interconnect interface; enabling another of the plurality of first-axis interconnects by the secondary first-axis interconnect interface; and enabling another of the plurality of second-axis interconnects by the secondary second-axis interconnect interface.

A further embodiment of the foregoing sensor array, wherein the primary and secondary first-axis interconnect interfaces are configured to: identify a fault on one or more of the plurality of first-axis interconnects; and interrogate any of the plurality of sensors by enabling an associated first-axis interconnect and an associated second-axis interconnect.

A further embodiment of the foregoing sensor array, wherein the primary and secondary second-axis interconnect interfaces are configured to: identify a fault on one or more of the plurality of second-axis interconnects; and interrogate any of the plurality of sensors by enabling an associated first-axis interconnect and an associated second-axis interconnect.

A further embodiment of the foregoing sensor array, wherein the sensor array is additively-manufactured.

A further embodiment of the foregoing sensor array, wherein the sensor array is configured to be disposed on a surface of an asset.

A further embodiment of the foregoing sensor array, wherein each of the plurality of sensors is selected from the group consisting of a piezoelectric sensor, a resistance temperature detector (RTD), a piezoresistive sensor, a micro-electrical mechanical system (MEMS) pressure sensor, and a MEMS accelerometer.

A method of interrogating a sensor in a sensor array having a lattice topology, the sensor array comprising a plurality of interconnects comprising an electrically-conductive layer sandwiched between two dielectric layers defining a plurality of first-axis interconnects, a plurality of second-axis interconnects, and a plurality of interconnect junctions, a plurality of sensor nodes, each disposed on an associated interconnect junction defining an associated first-axis line and second-axis line, a plurality of sensors, each disposed on an associated sensor node, a primary first-axis interconnect interface, electrically connected to the plurality of first-axis interconnects, and a primary second-axis interconnect interface, electrically connected to the plurality of second-axis interconnects, the method comprising performing the steps of: (a) enabling, with the primary first-axis interconnect interface, one of the plurality of first-axis interconnects; (b) enabling, with the primary second-axis interconnect interface, one of the plurality of second-axis interconnects; and (c) interrogating one of the plurality of sensors corresponding to the enabled first-axis interconnect and the enabled second-axis interconnect.

The method of the preceding paragraph can optionally include, additionally and/or alternatively, any one or more of the following features, configurations and/or additional components:

A further embodiment of the foregoing method, wherein each of the plurality of sensor nodes comprises: a first electrode, electrically connected to an associated first-axis line; a second electrode, electrically connected to associated second-axis line; and a bypass bridge, electrically isolating the associated second-axis line from the associated first-axis line.

A further embodiment of the foregoing method, wherein: the electrically-conductive layer comprises silver, copper, aluminum, gold, platinum, ruthenium, carbon, and/or alloys thereof; and each of the dielectric layers comprises a cured base material.

A further embodiment of the foregoing method, wherein the interconnects are flexible, thereby allowing the sensor array to conform to a curved surface profile.

A further embodiment of the foregoing method, wherein the bypass bridge comprises: an electrically-insulating substrate; a first electrically-conductive trace, disposed on the electrically-insulating substrate; a dielectric layer, disposed on the first conductive layer; and a second electrically-conductive trace, disposed on the dielectric layer, the second electrically-conductive trace being electrically isolated from the first electrically-conductive trace.

A further embodiment of the foregoing method, wherein each of the plurality of sensors is selected from the group consisting of a piezoelectric sensor, a resistance temperature detector (RTD), a piezoresistive sensor, a micro-electrical mechanical system (MEMS) pressure sensor, and a MEMS accelerometer.

A further embodiment of the foregoing method, further comprising performing the steps of: enabling, with a secondary first-axis interconnect interface electrically connected to the plurality of first-axis interconnects, one of the plurality of first-axis interconnects; and enabling, with a secondary second-axis interconnect interface electrically connected to the plurality of second-axis interconnects, one of the plurality of second-axis interconnects.

A further embodiment of the foregoing method, identifying a fault on one or more of the plurality of second-axis interconnects; and interrogating any of the plurality of sensors by enabling an associated first-axis interconnect and an associated second-axis interconnect.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A sensor array having a lattice topology, comprising:
   a plurality of interconnects comprising an electrically-conductive layer sandwiched between two dielectric layers, the plurality of interconnects defining:
      a plurality of first-axis interconnects;
      a plurality of second-axis interconnects; and
      a plurality of interconnect junctions;
   a plurality of sensor nodes, each disposed on an associated interconnect junction defining an associated first-axis line and second-axis line;
   a plurality of sensors, each disposed on an associated sensor node;
   a primary first-axis interconnect interface, electrically connected to the plurality of first-axis interconnects; and
   a primary second-axis interconnect interface, electrically connected to the plurality of second-axis interconnects;
   wherein each of the plurality of sensor nodes comprises:
      a first electrode, electrically connected to an associated first-axis line;
      a second electrode, electrically connected to an associated second-axis line; and
      a bypass bridge, electrically isolating the associated second-axis line from the associated first-axis line.

2. The sensor array of claim 1, wherein the interconnects are flexible, thereby allowing the sensor array to conform to a curved surface profile.

3. The sensor array of claim 1, wherein:
   the electrically-conductive layer comprises at least one of silver, copper, aluminum, gold, platinum, ruthenium, carbon, and/or alloys thereof; and
   each of the dielectric layers comprises a cured base material.

4. The sensor array of claim 1, wherein the bypass bridge comprises:
   an electrically-insulating substrate;
   a first electrically-conductive trace, disposed on the electrically-insulating substrate;
   a dielectric layer, disposed on the first conductive layer; and
   a second electrically-conductive trace, disposed on the dielectric layer, the second electrically-conductive trace being electrically isolated from the first electrically-conductive trace.

5. The sensor array of claim 1, wherein the primary first-axis interconnect interface and the primary second-axis interconnect interface can enable one of the plurality of first-axis interconnects and one of the plurality second-axis interconnects, respectively, thereby interrogating a sensor node associated with the enabled first-axis interconnect and the enabled second-axis interconnect.

6. The sensor array of claim 1, further comprising:
   a secondary first-axis interconnect interface, electrically connected to the plurality of first-axis interconnects; and
   a secondary second-axis interconnect interface, electrically connected to the plurality of second-axis interconnects.

7. The sensor array of claim 6, wherein two of the plurality of sensors can be interrogated at the same time by simultaneously:
   enabling one of the plurality of first-axis interconnects by the primary first-axis interconnect interface;
   enabling one of the plurality of second-axis interconnects by the primary second-axis interconnect interface;
   enabling another of the plurality of first-axis interconnects by the secondary first-axis interconnect interface; and
   enabling another of the plurality of second-axis interconnects by the secondary second-axis interconnect interface.

8. The sensor array of claim 6, wherein the primary and secondary first-axis interconnect interfaces are configured to:
   identify a fault on one or more of the plurality of first-axis interconnects; and
   interrogate any of the plurality of sensors by enabling an associated first-axis interconnect and an associated second-axis interconnect.

9. The sensor array of claim 6, wherein the primary and secondary second-axis interconnect interfaces are configured to:
   identify a fault on one or more of the plurality of second-axis interconnects; and
   interrogate any of the plurality of sensors by enabling an associated first-axis interconnect and an associated second-axis interconnect.

10. The sensor array of claim 1, wherein the sensor array is additively-manufactured.

11. The sensor array of claim 1, wherein the sensor array is configured to be disposed on a surface of an asset.

12. The sensor array of claim 1, wherein each of the plurality of sensors is selected from the group consisting of a piezoelectric sensor, a resistance temperature detector (RTD), a piezoresistive sensor, a micro-electrical mechanical system (MEMS) pressure sensor, and a MEMS accelerometer.

13. A method of interrogating a sensor in a sensor array having a lattice topology, the sensor array comprising:

a plurality of interconnects comprising an electrically-conductive layer sandwiched between two dielectric layers, the plurality of interconnects defining:
   a plurality of first-axis interconnects;
   a plurality of second-axis interconnects; and
   a plurality of interconnect junctions;
a plurality of sensor nodes, each disposed on an associated interconnect junction defining an associated first-axis line and second-axis line;
a plurality of sensors, each disposed on an associated sensor node;
a primary first-axis interconnect interface, electrically connected to the plurality of first-axis interconnects; and
a primary second-axis interconnect interface, electrically connected to the plurality of second-axis interconnects;
wherein each of the plurality of sensor nodes comprises:
   a first electrode, electrically connected to an associated first-axis line;
   a second electrode, electrically connected to an associated second-axis line; and
   a bypass bridge, electrically isolating the associated second-axis line from the associated first-axis line;
the method comprising performing the steps of:
(a) enabling, with the primary first-axis interconnect interface, one of the plurality of first-axis interconnects;
(b) enabling, with the primary second-axis interconnect interface, one of the plurality of second-axis interconnects; and
(c) interrogating one of the plurality of sensors corresponding to the enabled first-axis interconnect and the enabled second-axis interconnect.

14. The method of claim 13, wherein:
the electrically-conductive layer comprises silver, copper, aluminum, gold, platinum, ruthenium, carbon, and/or alloys thereof; and
each of the dielectric layers comprises a cured base material.

15. The method of claim 13, wherein the interconnects are flexible, thereby allowing the sensor array to conform to a curved surface profile.

16. The method of claim 13, wherein the bypass bridge comprises:
   an electrically-insulating substrate;
   a first electrically-conductive trace, disposed on the electrically-insulating substrate;
   a dielectric layer, disposed on the first conductive layer; and
   a second electrically-conductive trace, disposed on the dielectric layer, the second electrically-conductive trace being electrically isolated from the first electrically-conductive trace.

17. The method of claim 13, wherein each of the plurality of sensors is selected from the group consisting of a piezoelectric sensor, a resistance temperature detector (RTD), a piezoresistive sensor, a micro-electrical mechanical system (MEMS) pressure sensor, and a MEMS accelerometer.

18. The method of claim 13, further comprising performing the steps of:
   enabling, with a secondary first-axis interconnect interface electrically connected to the plurality of first-axis interconnects, one of the plurality of first-axis interconnects; and
   enabling, with a secondary second-axis interconnect interface electrically connected to the plurality of second-axis interconnects, one of the plurality of second-axis interconnects.

19. The method of claim 18, further comprising the steps of:
   identifying a fault on one or more of the plurality of second-axis interconnects; and
   interrogating any of the plurality of sensors by enabling an associated first-axis interconnect and an associated second-axis interconnect.

\* \* \* \* \*